US009317856B2

(12) United States Patent
Oulid-Aissa et al.

(10) Patent No.: US 9,317,856 B2
(45) Date of Patent: Apr. 19, 2016

(54) SYSTEM, METHOD AND COMPUTER READABLE MEDIUM FOR APPLICATION PLACEMENT

(75) Inventors: Mourad Oulid-Aissa, Frisco, TX (US); Tai-Bai Kong, Hazlet, NJ (US); Sidney Shiba, Richardson, TX (US); Carlos De Keukelaere, McKinney, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 1037 days.

(21) Appl. No.: 12/355,905

(22) Filed: Jan. 19, 2009

(65) Prior Publication Data

US 2010/0186022 A1 Jul. 22, 2010

(51) Int. Cl.
*G06Q 30/02* (2012.01)

(52) U.S. Cl.
CPC ..................... *G06Q 30/02* (2013.01)

(58) Field of Classification Search
CPC ............................... G06F 9/4812; G06F 9/542
USPC .......................................................... 719/318
See application file for complete search history.

(56) References Cited

U.S. PATENT DOCUMENTS

| 6,971,109 | B1 * | 11/2005 | Williams et al. ............. 719/318 |
| 7,499,704 | B1 * | 3/2009 | Bonner ...................... 455/435.1 |
| 2001/0052000 | A1 | 12/2001 | Giacalone |
| 2002/0023274 | A1 | 2/2002 | Giacalone |
| 2004/0202150 | A1 | 10/2004 | Lin et al. |
| 2004/0204967 | A1 | 10/2004 | Lee et al. |
| 2005/0283800 | A1 | 12/2005 | Ellis |
| 2007/0043550 | A1 * | 2/2007 | Tzruya ............................ 703/24 |
| 2007/0121584 | A1 * | 5/2007 | Qiu et al. ...................... 370/352 |
| 2007/0140299 | A1 * | 6/2007 | Hofmann et al. ............. 370/486 |
| 2007/0150480 | A1 * | 6/2007 | Hwang et al. .................. 707/10 |
| 2007/0263808 | A1 * | 11/2007 | Van Wyk et al. ......... 379/142.01 |
| 2008/0040767 | A1 * | 2/2008 | McCarthy et al. ............ 725/132 |
| 2008/0183528 | A1 * | 7/2008 | Chieu et al. ....................... 705/7 |
| 2009/0049469 | A1 * | 2/2009 | Small et al. ..................... 725/35 |
| 2009/0214013 | A1 * | 8/2009 | Cassanova et al. ...... 379/142.04 |
| 2009/0293078 | A1 * | 11/2009 | Pirani et al. ...................... 725/9 |
| 2009/0320076 | A1 * | 12/2009 | Chang ............................ 725/60 |

FOREIGN PATENT DOCUMENTS

| CN | 101212391 A | 7/2008 |
| JP | 2008079215 A | 4/2008 |
| KR | 10-0637038 | 6/2005 |

* cited by examiner

*Primary Examiner* — Andy Ho
*Assistant Examiner* — Abdou Seye
(74) *Attorney, Agent, or Firm* — RGIP LLC

(57) ABSTRACT

In a service delivery environment, multiple services may be provided across multiple service delivery platforms. An application placement system includes an event adaptor that maps events in the service deliver environment to application events. An application placement engine is triggered by the application events to invoke applications in end devices, such as an IPTV or set-top box, of the service delivery environment. Applications may also be invoked across different media types.

24 Claims, 9 Drawing Sheets

SYSTEM, METHOD AND COMPUTER READABLE MEDIUM FOR APPLICATION PLACEMENT

FIELD OF THE INVENTION

This invention relates to multimedia services and applications and in particular to the placement of applications in a multimedia platform such as an Internet Protocol TeleVision (IPTV) service platform.

BACKGROUND OF THE INVENTION

The state of the art in multimedia platforms focuses on content management and content deployment. For example, AdPoint by Tanberg manages the next generation of video advertising technologies, including Video On Demand (VOD) advertisement placements and targeted ad systems. In this context, application placement such as content and advertisements are implemented within the video streams based on configurable and provisionable methods of procedure.

A problem with existing platforms is that applications are deployed within multimedia services based on pre-configured schedules, preset view lists and hard-coded rules.

What is required is a system, method and computer readable medium that can handle the needs of a dynamic multimedia environment from multiple perspectives, including the need to coordinate in real-time how applications are invoked and how application features interact based on configurable rules.

SUMMARY OF THE INVENTION

In one aspect of the disclosure, there is provided a system comprising a plurality of devices providing service delivery to a user and an application placement system that detects an event, determines an application associated with the event and causes the application to be executed in one or more of the devices.

In one aspect of the disclosure, there is provided an application placement system comprising an event adaptor that maps a plurality of trigger events to a plurality of application events and an application placement engine. The application placement engine receives an application event from the event adaptor and invokes an application associated with the application event in one or more end devices.

In one aspect of the disclosure, there is provided a method of placing an application comprising detecting a trigger event, determining an application associated with the trigger event, and invoking the application in an end device.

In one aspect of the disclosure, there is provided a method for invoking an application in a device comprising triggering an application event in a first device and invoking an application associated with the application device in a second device.

In one aspect of the disclosure, there is provided a computer readable medium comprising instructions for detecting an application event, determining an application associated with the application event, determining a device associated with the application event and invoking the application in the device.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
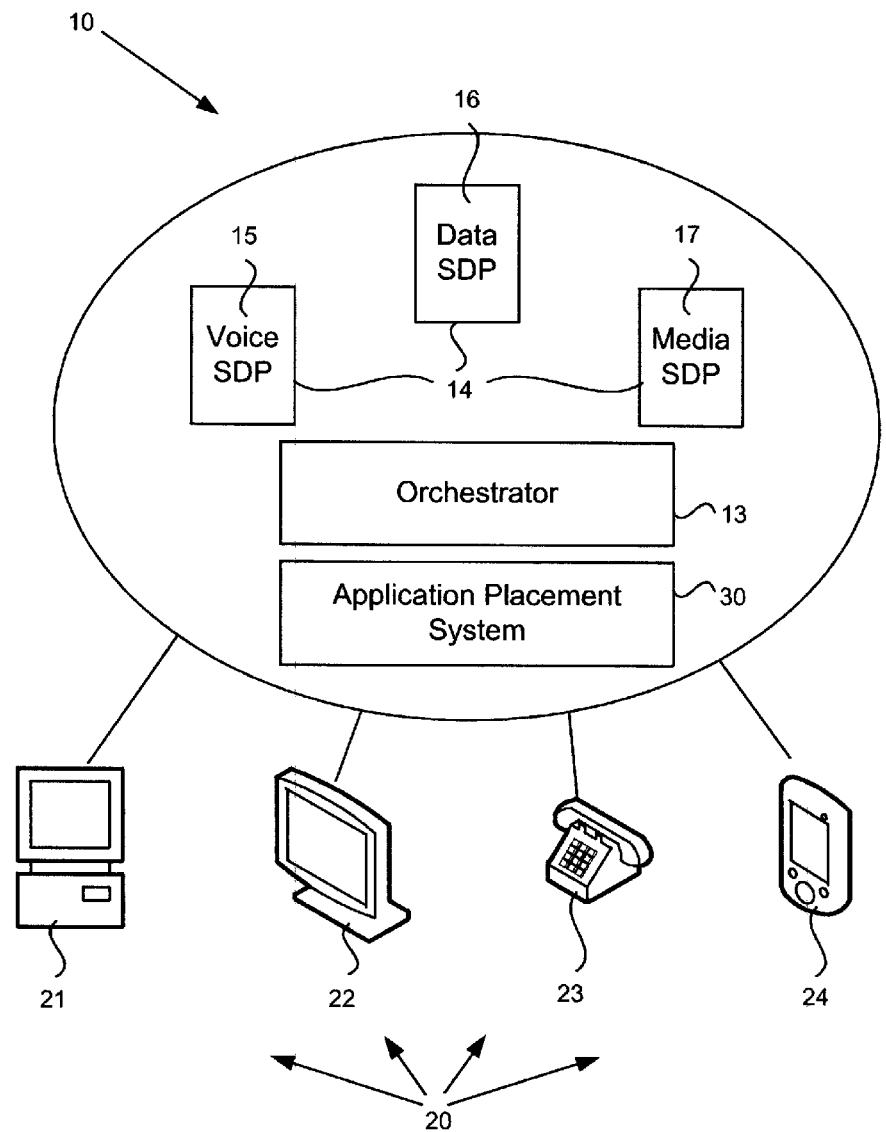
FIG. 1 schematically represents a service delivery system.

A service delivery system 10 is illustrated in FIG. 1. The service delivery system 10 delivers communications services to end devices 20 through a plurality of service delivery platforms 14. Service categories may include voice 15, data 16 and media 17. Voice services may include PSTN, PLMN, Voice over IP (VoIP) and messaging. Data services may include web, internet, data, email and messaging. Media services may include television, IPTV, satellite, cable, and interactive television (iTV). Other services will be apparent to a person skilled in the art. Architectures and platforms for delivery of these services are known to a person skilled in the art and are therefore not detailed here. An orchestrator 13 may be provided for blending of services across the multiple service delivery platforms 14, thereby allowing cross-correlation of services as will be described in further detail below. The orchestrator 13 provides service enablers for the service delivery platforms 14. The orchestrator is thus used to translate events between service delivery platforms and the access world, coordinate services and applications interactions, federate end-user data across services and re-use functions/resources of the service delivery platforms 14 into blended services. Through blending of services, end-to-end services may be provided across hybrid networks (e.g., PSTN Voice network and IPTV network) that leverage common resources transparently from development and deployment perspectives and seamlessly from a usage perspective.

End devices 20 may include computers 21; television devices 22 such as IPTVs, set-top boxes (STB) and personal video recorders (PVR); fixed line telecommunications devices 23 such as a PSTN telephone; and mobile telecommunications devices 24 such as mobile telephones, mobile browsers, personal digital assistants (PDA) and the like. Other end devices will be apparent to a person skilled in the art.

Figure 2:
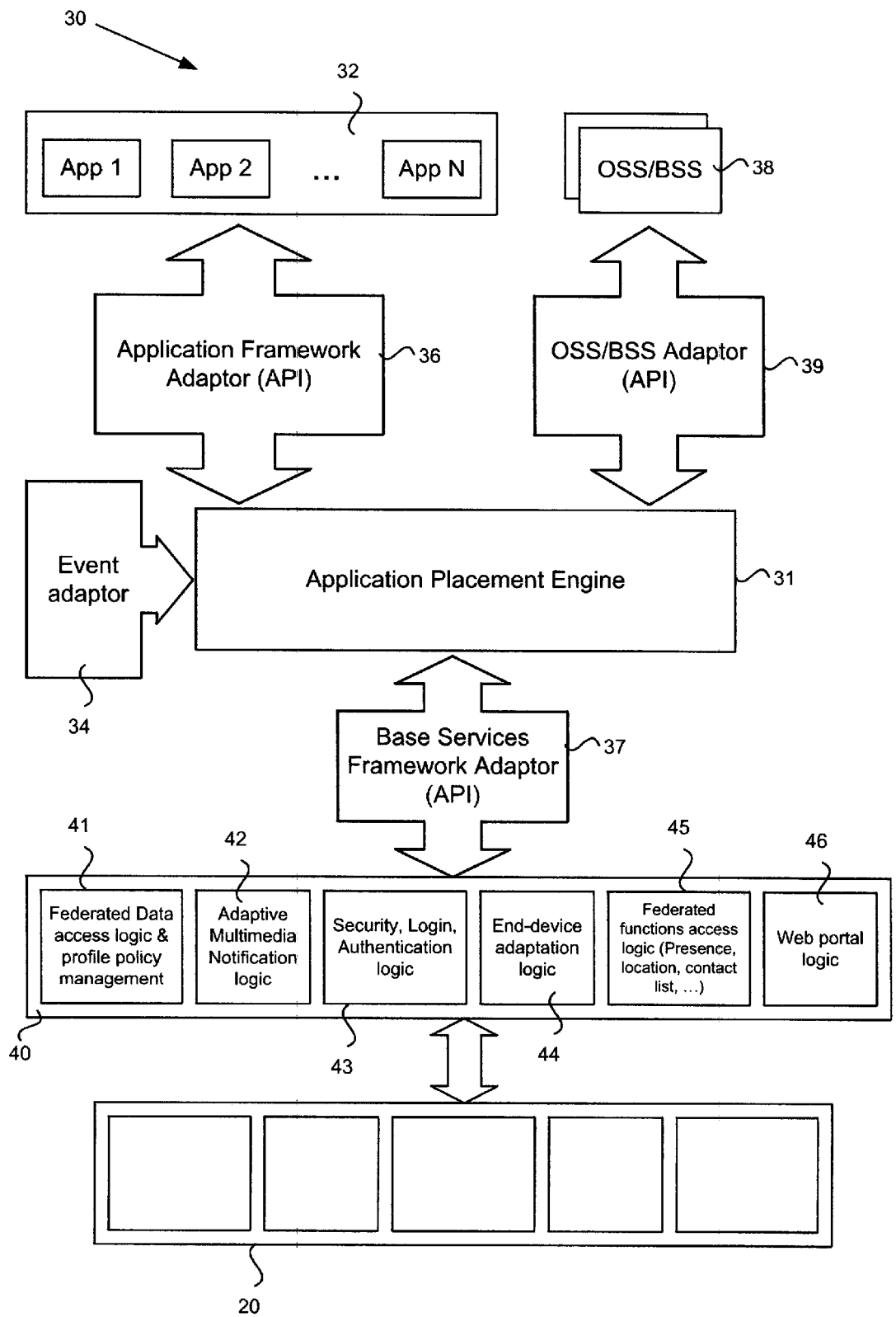
FIG. 2 schematically represents an application placement system.

In accordance with an embodiment of the disclosure, the system 10 includes an application placement system 30 described in more detail with reference to FIG. 2. The application placement system 30 has an application placement engine 31, functioning as a finite state machine, that provides generic/normalized interfaces between applications 32, e.g. App 1, App 2 . . . App N, and base services 40 through an application framework adaptor 36 and a base services framework adaptor 27 respectively. Base services 40 generically refers to application programming interfaces (API) for access to service delivery platform services at application and framework layers. Base services shown in FIG. 2 include Federated Data access logic & profile policy management 41; Adaptive Multimedia Notification logic 42; Security, Login, Authentication logic 43; End-device adaptation logic 44; Federated functions access logic (Presence, location, contact list, etc) 45; and Web portal logic 46. Other base services will be apparent to the person skilled in the art.

The application placement engine 31 handles invocation of applications 32 based on events and logic of the service context. Events are mapped to applications by an event adaptor 34. Being event driven, the placement of applications is dynamic and can be performed in real-time. In various embodiments, events may include, without limitation, end-user actions; network service events; content provider events; Operation, Administration, Maintenance & Provisioning (OAM&P) events; Operation Support Systems (OSS) events; Basic Service Set (BSS) events; third party events, and other application events that may be apparent to a person skilled in the art. Events may be scheduled, logic-functionality driven, based on subscriber profile, based on service configuration and provisioning, based on network configuration and provisioning, or based on viewing patterns. OSS/BSS events may be provided from OSS/BSS systems 38 via an OSS/BSS adaptor API 39. Events may be initiated in other ways apparent to a person skilled in the art.

Once the application placement system 30 invokes an application, the application placement system 30 is not involved in the execution of the application. In one embodiment, applications can be invoked simply via forwarding an HTTP request from a set-top box (STB) to an applications web server or sending a message to an application to start action.

In one embodiment, the application placement engine controls application placement for a plurality of users and is thus located in a central area such as operated by a service provider. In one embodiment, the application placement engine may be specific to a user's environment, for example within the user's home, in which case the application placement engine may be located within the user's premises (e.g. residential or business), shared between several premises or at the central location described above.

Figure 3:
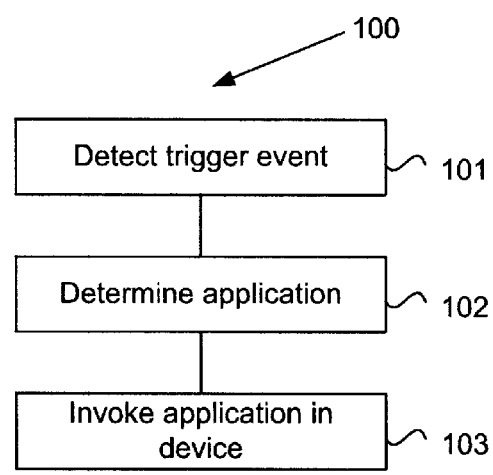
FIG. 3 represents a flow chart for an application placement method.

A method using the application system 30 of FIG. 2 will now be described with reference to the flowchart 100 of FIG. 3. At step 101, a triggered event is detected in the application placement system. The triggered event may be triggered in a manner as described above. At step 102, the event adaptor 34 determines an application 32 associated with the event and invokes the application in an end device 20 at step 103. In one embodiment, the event may be triggered in a first end device and the application may be invoked in a second end device.

Figure 4:
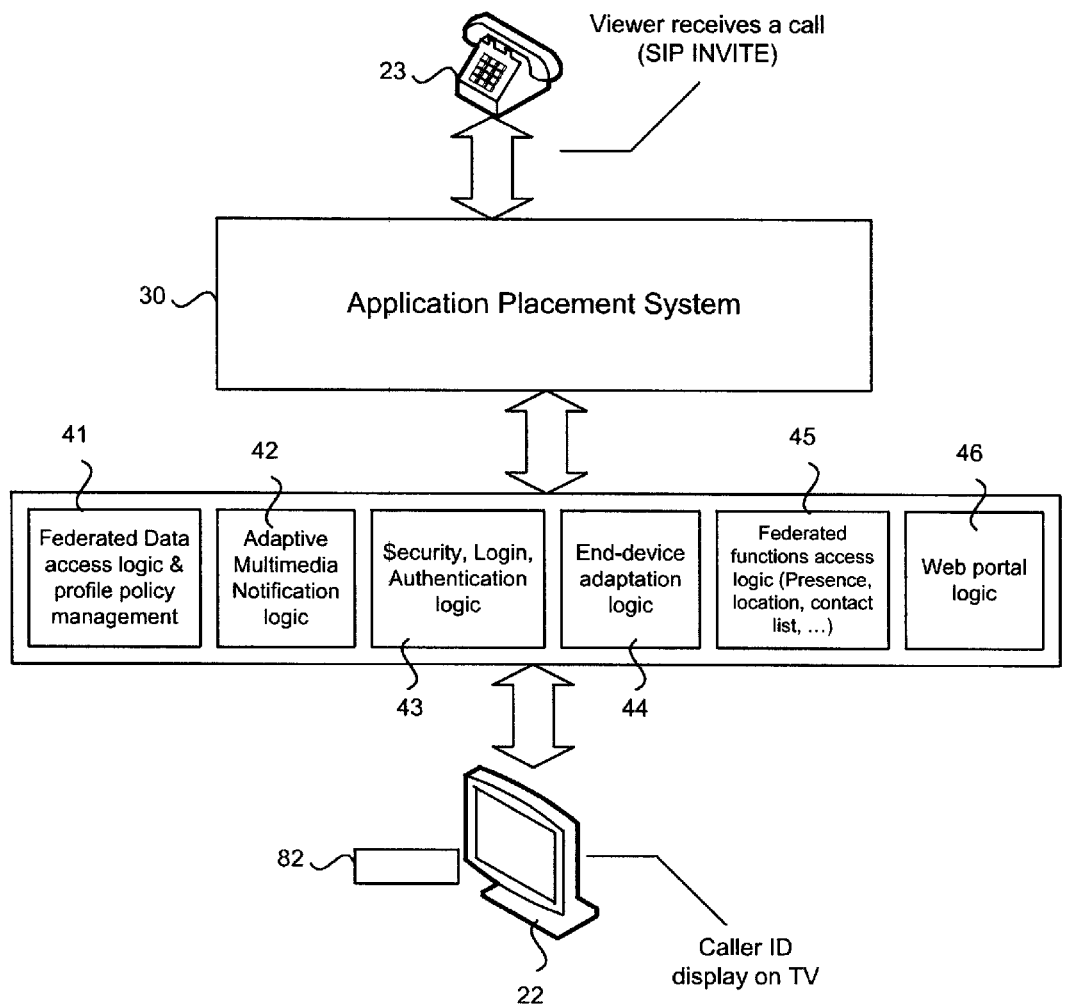
FIGS. 4 and 5 schematically represent a first example of an application placement system and method.
Figure 5:
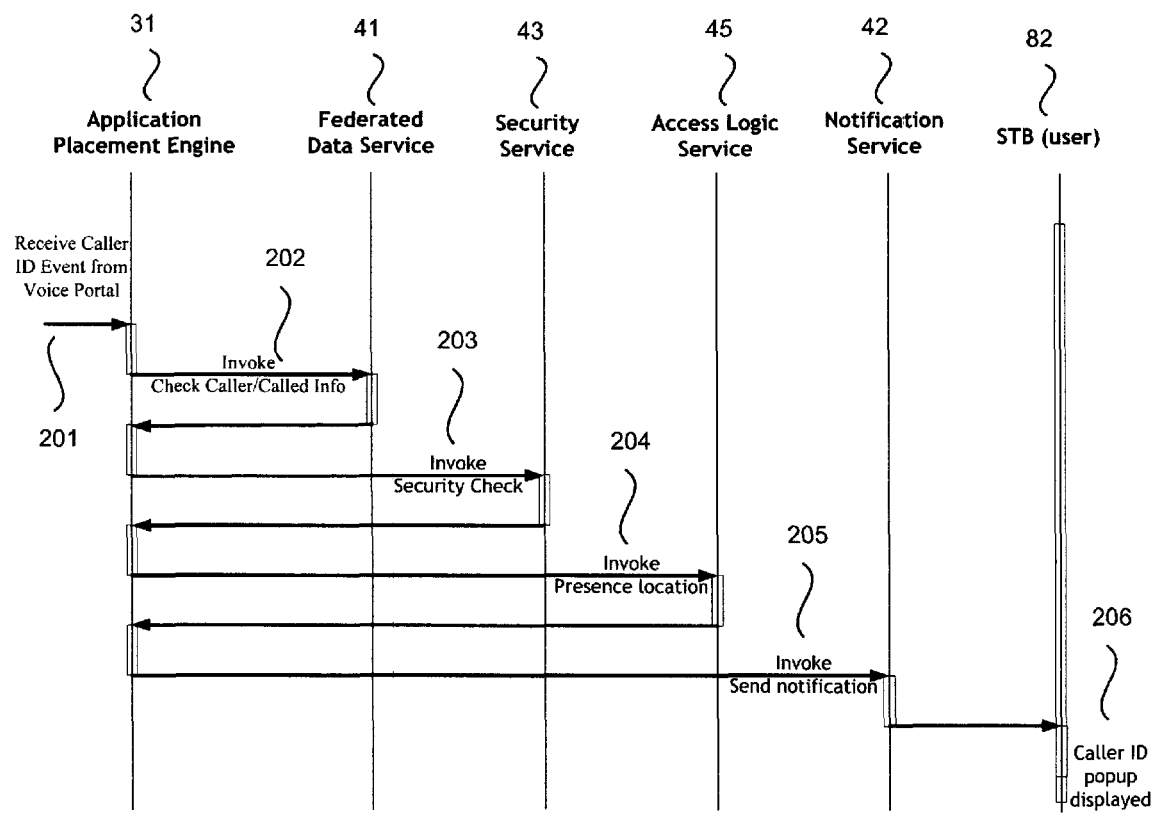

A specific example will now be described with reference to FIGS. 4 and 5. This example relates to an incoming call to a user's phone 23. The application placement system 30 of FIG. 2 is used to display the caller identity on the user's IPTV 22 via a Set-Top Box (STB) 82. The application placement engine 31 triggers a voice notification process to send a caller ID notification to the viewer. The application placement engine 31 is responsible for orchestrating all services required to accomplish the task (Federated Data, Security, Access Logic and Notification). A Business Process Execution Language (BPEL) process may be used to describe the orchestration of services. At step 201 (FIG. 5) the application placement engine receives a caller ID trigger event from a voice portal application. The voice portal application uses the event adaptor API 34 (FIG. 2) to map the Session Initiation Protocol (SIP) message INVITE to an application event type. The application placement engine 31 then invokes the federated data service 41 to determine the caller ID (step 202). At step 203, a security service 43 check is performed and then the access logic service 45 is used (step 204) to determine whether the notification service is currently available to the user. If available, the notification service 42 is invoked (step 205) to the STB 82 to cause a popup display of the caller ID to be displayed on the user's TV 22 (step 206).

Figure 6:
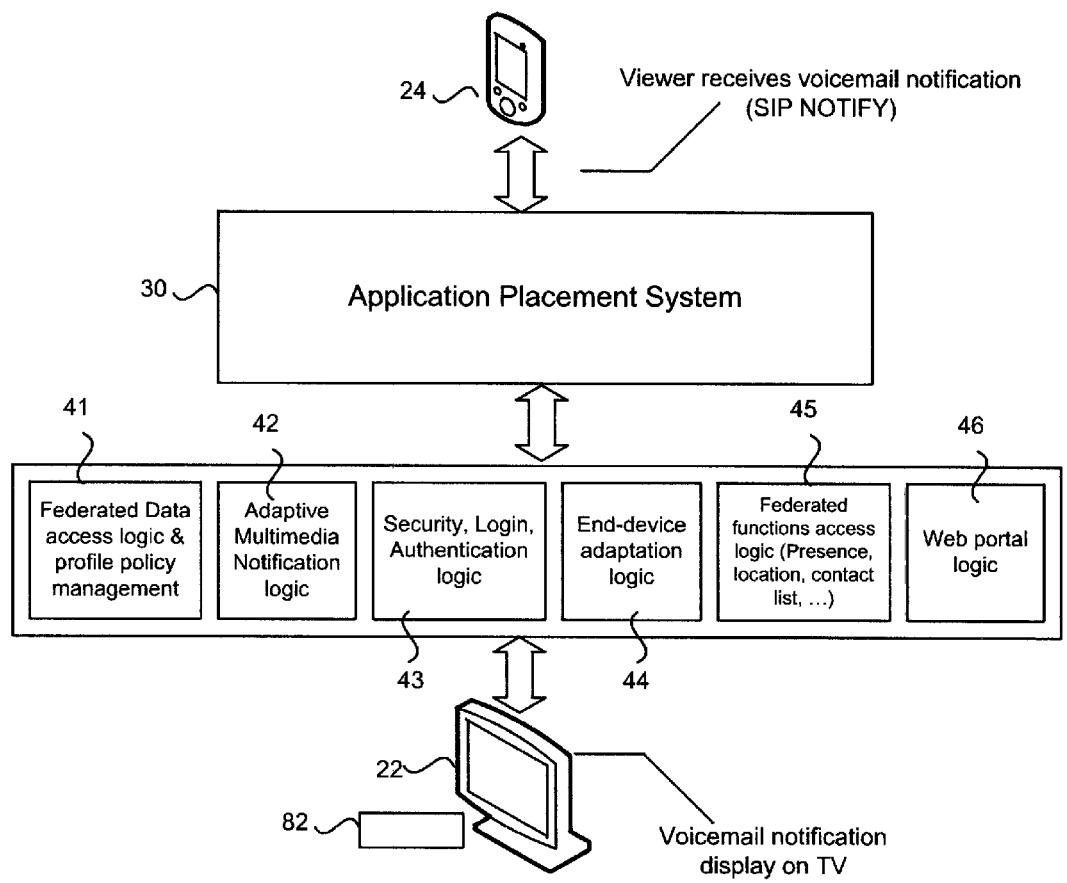
FIGS. 6 and 7 schematically represent a second example of an application placement system and method.
Figure 7:
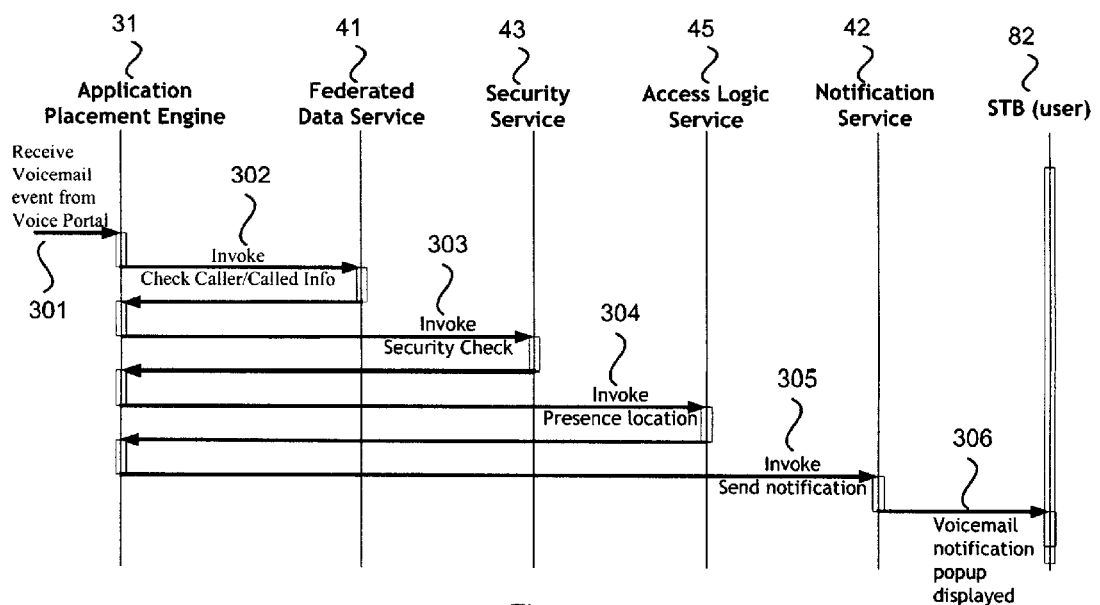

A further example will now be described with reference to FIGS. 6 and 7. This example relates to placement of a voicemail notification from a mobile phone 24 to a user's IPTV 22 via a STB 82. A voice portal application uses the event adaptor API 34 (FIG. 2) to map the SIP message NOTIFY trigger event to an application event type and provides the application event to the application placement engine 31 (step 301). The application placement engine 31 triggers a voice notification process to send a voicemail notification to the user. The application placement engine 31 then invokes the federated data service 41 to determine the caller ID (step 302). At step 303, a security service 43 check is performed and then the access logic service 45 is used (step 304) to determine whether the notification service is currently available to the user. If available, the notification service 42 is invoked (step 305) to cause a popup display of a voicemail notification on the user's TV (step 306).

As for the previous example, the application placement engine is responsible for orchestrating all services required to accomplish the notification (Federated Data, Security, Access Logic and Notification) using BPEL processes.

Figure 8:
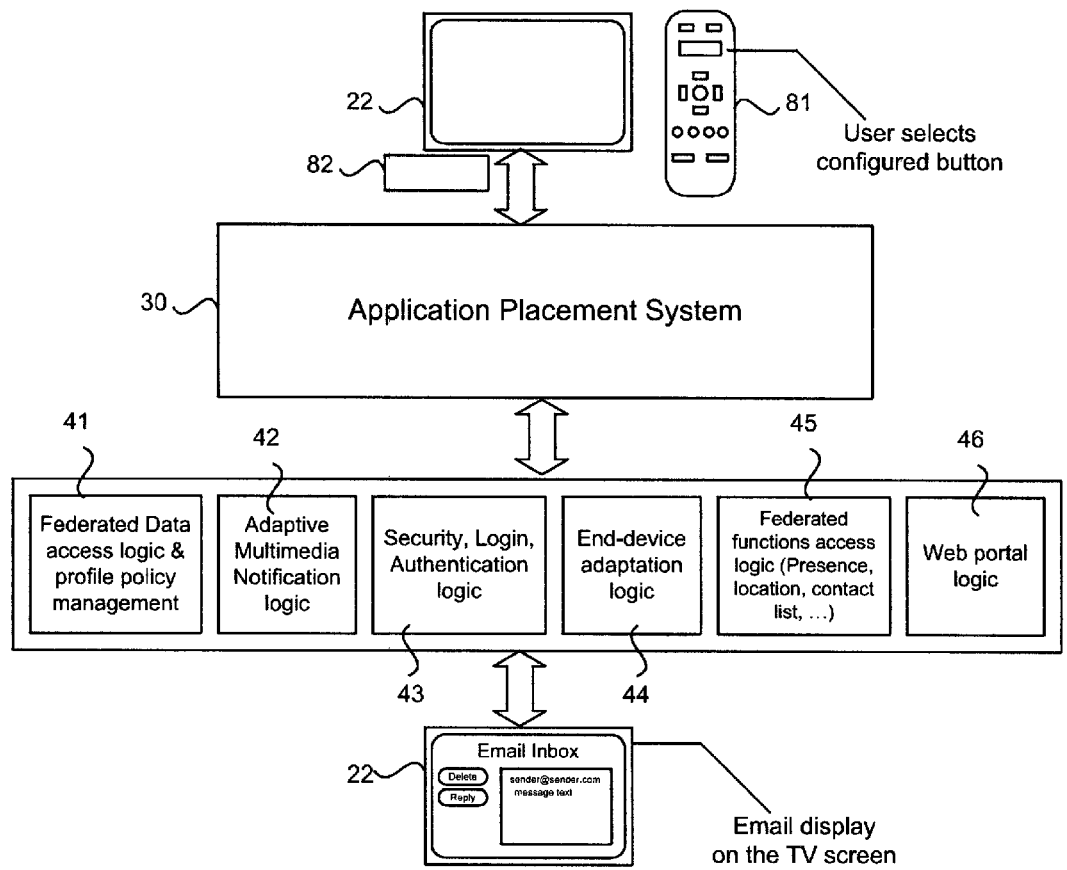
FIGS. 8 and 9 schematically represent a third example of an application placement system and method.
Figure 9:
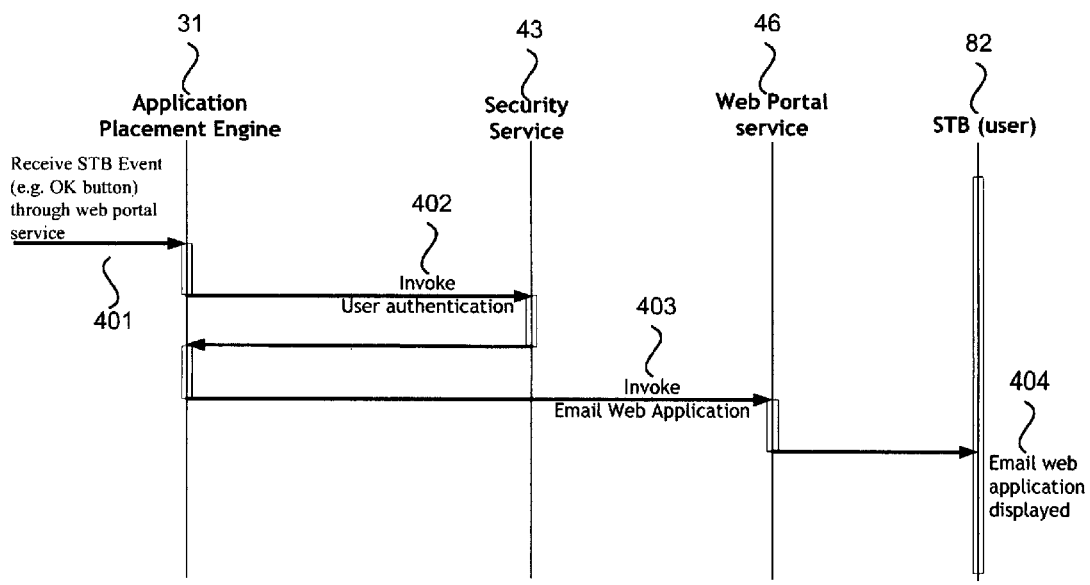

A further example will now be described with reference to FIGS. 8 and 9. This example relates to placement of an email web application to a user's TV 22 via a STB 82. At step 401, the application placement engine 31 receives an STB Event triggered by a viewer, such as the selection of a configured button, e.g. the "OK" button on a remote control 81. The STB 82 sends an http GET command to a web portal service, which is adapted into an application event using the event adaptor API 34. The http GET command provides information related to the email application and at step 402, the application placement engine authenticates the viewer by invoking the security service 43. Next, the web portal service 46 "uploads" the email web application to the STB 82 (response to http GET) (step 403) and the email application is displayed on the user's TV 22 (step 404).

Figure 10:
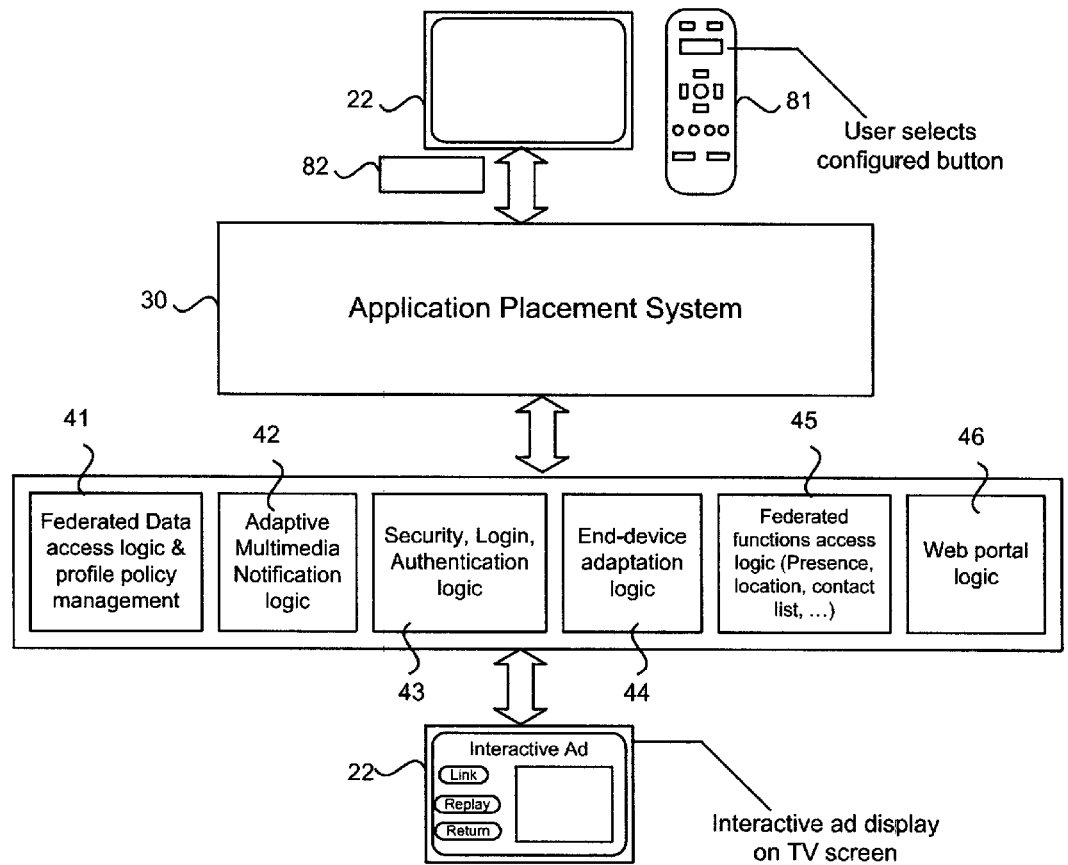
FIGS. 10 and 11 schematically represent a fourth example of an application placement system and method.
Figure 11:
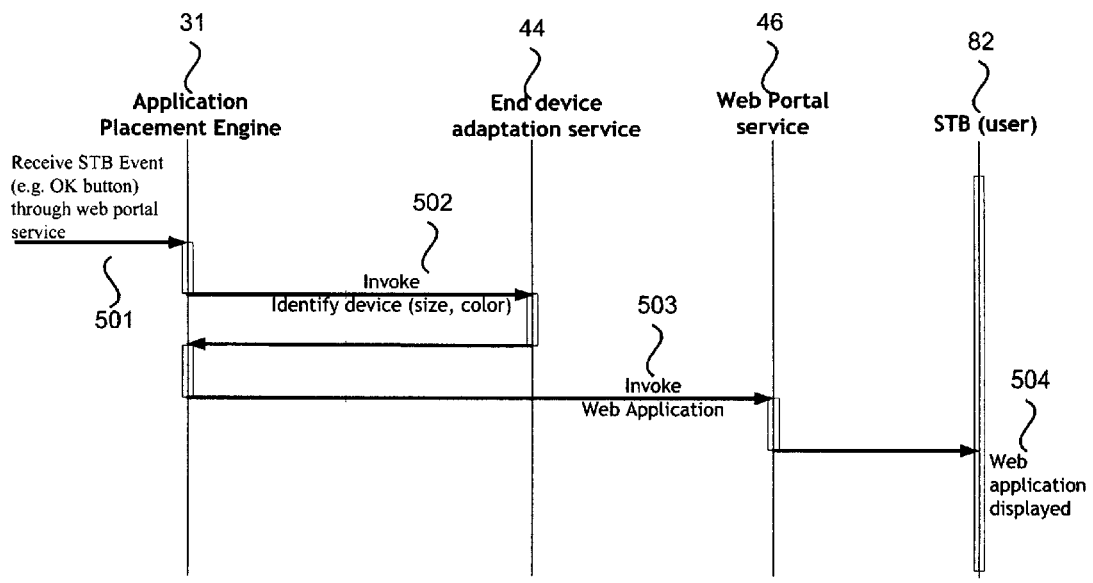

A further example will now be described with reference to FIGS. 10 and 11. The example relates to the placement of interactive advertisements on a user's IPTV 22 via a STB 82. At step 501, the application placement engine 31 receives an STB Event triggered by a viewer, such as the selection of a configured button, e.g. the "OK" button on a remote control 81. The STB sends an http GET command to a web portal service, which is mapped into an application event using the event adaptor API 34. The http GET command provides information related to the interactive advertisement application and at step 502, the application placement engine 30 identifies the parameters of the destination media and end device (size, color, type) by invoking the end-device adaptation service 44. Next, the web portal service 46 "uploads" the interactive advertisement application to the STB 82 (response to http GET) (step 503) and the interactive advertisement is displayed on the user's TV (step 504).

In one embodiment, the interactive advertisement may be triggered by the user selecting a video on demand application. The interactive display of the ad may include additional commands, selected through buttons of the remote control 81, that allow more details of the advertisement to be viewed. For example, links may be provided to the advertiser's website, as well as commands to view the ad again or return to TV viewing. Selection of commands may invoke further applications, such as display of a website. The placement of the interactive advertisement by the application placement engine in response to video on demand viewing allows the timing of the placement of the advertisement to be varied without being limited to a fixed ad placement schedule. Interactive advertisement applications may be placed at other times, such as when a viewer re-starts viewing after pausing.

The Interactive Advertisement service allows the service provider to indicate to a viewer that an Interactive Ad is available by showing a small call-for-action indicator in a corner of the TV screen (e.g., blinking sign, popup). The user may choose to go interactive by selecting a remote control button (e.g., red button, OK button, or "go interactive"), which may be customizable. The service provider may have the ability to choose the triggering context based on the service (e.g. Live TV program) and time an interactive application is available. For example, an interactive application may be available during a commercial ad airing; during a Live TV program; or before, during, and/or after a VOD viewing.

Interactive ads may be regular ads or may be targeted ads, similar to dynamic web sites where dedicated ad spaces in a web page are populated with advertisements that match a certain number of criteria (e.g., user profile, viewing context, etc). User profile criteria may include gender, age, viewing profile (e.g., action movie). Where an interactive ad is available for showing, as indicated by a popup notification, the user may ignore the notification (timeout) or choose to see the details by selecting the appropriate remote control button.

In one embodiment, applications may include notification services which allow a service provider to display an unsolicited multimedia message (e.g. scrolling text/graphic message bar) at a configurable date/time. The service provider may have the ability to input the multimedia (text/graphic/audio) message to be displayed. The multimedia message can be used for promoting an event in a region or can be used as an Emergency Alert System (EAS). The multimedia message can be displayed in the screen regardless of the service being viewed (Live TV, VOD, Interactive Ad). In one embodiment, the viewer may not have control over the multimedia message display (e.g., the remote control cannot terminate the message). The service provider may have the ability to indicate the region where the text message shall be displayed (national, regional, local, per household, per STB).

The embodiments described above give the providers of multimedia services the flexibility to trigger applications without being restricted to hard-coded schedules, preset view lists and rigid rules. Since the application placement engine is a real-time engine, it can accommodate a wide range of configurable operational needs for optimal impact on consumers. The handling of feature interactions provided by one or more of the above described embodiments opens the door to defining new consumer and business oriented multimedia services, thus bringing in new sources of revenue to the service providers, the content providers and the technology suppliers.

Figure 12:
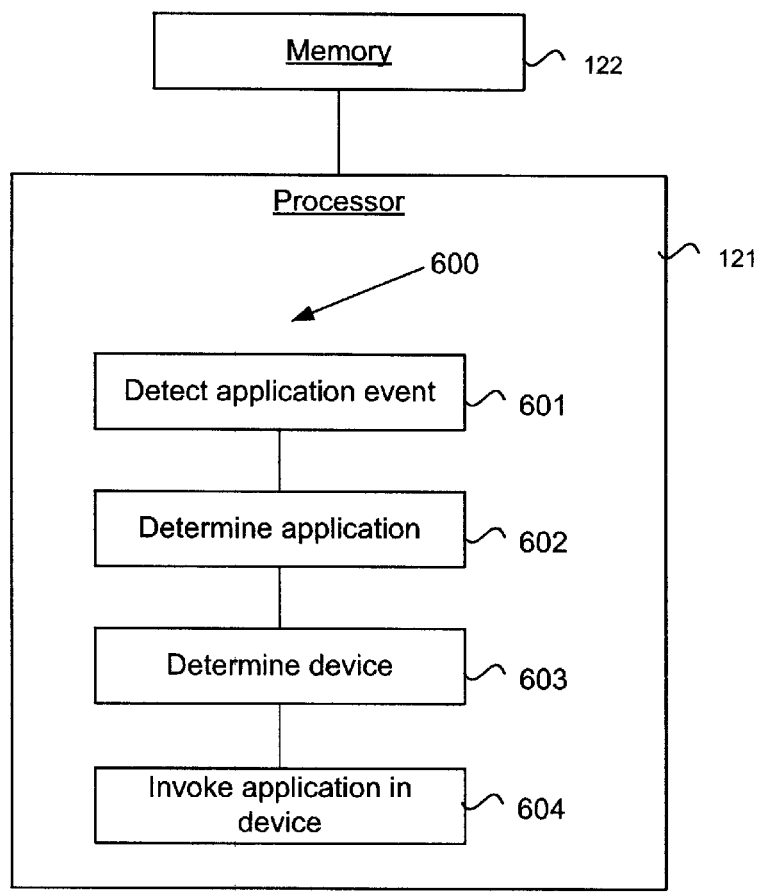
FIG. 12 represents a processor and memory executing an instruction set.

In one embodiment described with reference to FIG. 12, the application placement system 30 may comprise at least one processor 121 operatively associated with at least one memory 122. The memory 122 may store an instruction set that may be executed on the processor 121. The instructions, when executed allow the application placement system to detect an application event 601, determine an application associated with the application event 602, determine a device associated with the application event 603 and invoke the application in the device 604.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A system, comprising:
a plurality of user accessible devices that provide an application placement device configured to:
detect an event triggered by a first device of said user accessible devices, wherein the event is call related;
determine an application associated with said event, wherein the application provides call related information;
forward a request to invoke said application to an application placement engine;
map the request to the detected event;
determine information related to the application and information related to a destination device configured to invoke execution of said application based on the map of the request to the detected event; and
invoke execution of said application in the destination device as a second device of said user accessible devices to provide the call related information associated with the detected event.

2. The system according to claim 1, wherein said application placement device causes said application to be executed in real-time relative to said event.

3. The system according to claim 1, further comprising:
an event adaptor that maps a plurality of events triggered by said plurality of user accessible devices to a plurality of applications.

4. The system according to claim 1, wherein the first device is a telecommunications device and wherein the second device is an Internet protocol television (IPTV) enabled device.

5. The system according to claim 1, wherein the application is a voicemail notification application.

6. The system according to claim 1, wherein the application is a caller ID notification application.

7. The system according to claim 1, wherein the first device is a remote control for an Internet protocol television (IPTV) enabled device and wherein the second device is an IPTV enabled device.

8. The system according to claim 7, wherein the application is an interactive advertisement application.

9. The system according to claim 1, further comprising:
at least one service delivery engine, wherein the application placement engine detects an event triggered by said at least one service delivery engine.

10. An application placement apparatus, comprising:
a memory; and
a processor configured to
map a plurality of trigger events to a plurality of application events;
detect an event triggered by a first end device of a plurality of user accessible end devices, wherein the event triggered is call related;
determine an application associated with the event, wherein the application provides call related information;
forward a request to invoke said application to an application placement engine;
map the request to the detected event;
determine information related to the application and information related to a destination device configured to invoke execution of said application based on the map of the request to the detected event; and
trigger the execution of the application in a destination device as a second end device of said user accessible devices responsive to the detected event to provide the call related information associated with the detected event.

11. The application placement apparatus according to claim 10, wherein said trigger events are triggered on the first end device in a multimedia platform and wherein said application is performed on the second end device in said multimedia platform.

12. The application placement apparatus according to claim 11, wherein said first end device provides service across a first delivery medium and wherein said second end device provides service across a second delivery medium.

13. The application placement apparatus according to claim 10, wherein said second end device comprises an Internet protocol television (IPTV) enabled device.

14. The application placement apparatus according to claim 10, wherein said application is invoked in real-time relative to said trigger events.

15. The application placement apparatus according to claim 10, wherein execution of said application causes a display of an Internet protocol television (IPTV) enabled device to be modified.

16. The application placement apparatus according to claim 10, wherein the processor is further configured to interface between an application placement engine and a plurality of base services.

17. The application placement apparatus according to claim 10, wherein the processor is further configured to provide an interface between an application placement engine and a plurality of applications.

18. A method of placing an application, comprising:
detecting a trigger event triggered by a first device of a plurality of user accessible devices, wherein the trigger event is call related;
determining an application associated with said trigger event, wherein the application provides call related information;
forwarding a request to invoke said application to an application placement engine;
mapping the request to the detected event;
determining information related to the application and information related to a destination device configured to invoke execution of said application based on the map of the request to the detected event; and
invoking execution of said application in the destination device as a second device of said user accessible devices to provide the call related information associated with the detected event.

19. The method according to claim 18, wherein executing said application in the second device of said user accessible devices further comprises determining one or more parameters of said second device and adapting said application to said one or more parameters of said second device.

20. A method for invoking an application, comprising:
triggering an application event in a first device, wherein the event is call related;
detecting an application associated with the application event, wherein the application provides call related information;
forwarding a request to invoke said application to an application placement engine;
mapping the request to the detected event;
determining information related to the application and information related to a destination device configured to invoke execution of said application based on the map of the request to the detected event; and
invoking execution of the application in the destination device as a second device to provide the call related information associated with the detected event.

21. The method according to claim 20, further comprising:
mapping said application event to said application.

22. The method according to claim 21, wherein said first device is an end device of a first media delivery type and wherein said second device is an end device of a second media delivery type different from the first media delivery type.

23. A non-transitory computer readable storage medium comprising instructions that when executed cause a processor to perform:
detecting an event triggered by a first device of a plurality of user accessible devices, wherein the event is call related;
determining an application associated with said event, wherein the application provides call related information;
forwarding a request to invoke said application to an application placement engine;
mapping the request to the detected event;
determining information related to the application and information related to a destination device configured to invoke execution of said application based on the map of the request to the detected event;
determining the destination device as a second device of said user accessible devices associated with said event; and
invoking execution of said application in said second device to provide the call related information associated with the detected event.

24. The non-transitory computer readable storage medium according to claim 23, further comprising instructions that cause the processor to perform:
mapping the event to at least one application event.

* * * * *